United States Patent
Elazzouni et al.

(10) Patent No.: US 12,526,717 B2
(45) Date of Patent: Jan. 13, 2026

(54) TECHNIQUES FOR IMPROVING A NETWORK ENERGY SAVINGS MODE

(71) Applicant: QUALCOMM Incorporated, San Diego, CA (US)

(72) Inventors: Sherif Elazzouni, San Diego, CA (US); Changhwan Park, San Diego, CA (US); Shankar Krishnan, San Diego, CA (US); Navid Abedini, Basking Ridge, NJ (US); Naeem Akl, Bridgewater, NJ (US); Hung Dinh Ly, San Diego, CA (US); Ozcan Ozturk, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 376 days.

(21) Appl. No.: 18/186,108

(22) Filed: Mar. 17, 2023

(65) Prior Publication Data
US 2024/0314665 A1    Sep. 19, 2024

(51) Int. Cl.
*H04W 36/36* (2009.01)
*H04W 36/00* (2009.01)
*H04W 36/24* (2009.01)

(52) U.S. Cl.
CPC ..... *H04W 36/362* (2023.05); *H04W 36/0064* (2023.05); *H04W 36/0085* (2018.08); *H04W 36/249* (2023.05)

(58) Field of Classification Search
CPC ......... H04W 36/0069; H04W 36/0064; H04W 36/00692; H04W 36/0085;
(Continued)

(56) References Cited

U.S. PATENT DOCUMENTS

| 2019/0223073 A1* | 7/2019 | Chen ............... H04W 36/0077 |
| 2024/0292308 A1* | 8/2024 | Hwang ............... H04W 76/27 |
| 2025/0071633 A1* | 2/2025 | Tseng ................. H04L 1/1822 |

FOREIGN PATENT DOCUMENTS

WO    WO-2023170613 A1 *    9/2023    ........ H04W 36/0058

OTHER PUBLICATIONS

Fujitsu: "Consideration on group mobility for network energy saving", 3GPP TSG-RAN WG2 Meeting #120, R2-2212641, 3rd Generation Partnership Project, Mobile Competence Centre, 650, Route Des Lucioles, F-06921, Sophia-Antipolis Cedex, France, vol. 3GPP RAN 2, No. Toulouse, FR, Nov. 14-Nov. 18, 2022, Nov. 4, 2022, XP052216710, 3 Pages, p. 1-p. 3.

(Continued)

*Primary Examiner* — Mohamed A Kamara
(74) *Attorney, Agent, or Firm* — Patterson & Sheridan, LLP

(57) ABSTRACT

Certain aspects of the present disclosure provide techniques for improving a network energy saving (NES) mode. An example method performed by a first user equipment (UE) includes receiving, from a first network entity associated with a source cell, configuration information indicating one or more conditions for executing a conditional handover from the first network entity associated with the source cell to a second network entity associated with a target cell, receiving, from the first network entity associated with the source cell, a trigger signal including a trigger command for the conditional handover, and taking one or more actions related to executing the conditional handover based on the trigger signal and the one or more conditions.

30 Claims, 9 Drawing Sheets

(58) Field of Classification Search
CPC ........... H04W 36/00837; H04W 36/08; H04W 36/24; H04W 36/36; H04W 36/362; H04W 36/249; H04W 76/15; H04W 76/30
See application file for complete search history.

(56) References Cited

OTHER PUBLICATIONS

Intel Corporation: "CHO procedure enhancement for NES", 3GPP TSG-RAN WG2 Meeting #121, R2-2300608, 3rd Generation Partnership Project, Mobile Competence Centre, 650, Route Des Lucioles, F-06921, Sophia-Antipolis Cedex, France, vol. 3GPP RAN 2, No. Athens, GR, Feb. 27-Mar. 3, 2023, Feb. 17, 2023, XP052245251, 4 Pages, p. 1-p. 4.

International Search Report and Written Opinion—PCT/US2024/016392—ISA/EPO—Jun. 20, 2024.

LG Electronics Inc: "Connected mode mobility", 3GPP TSG-RAN WG2 Meeting #120, R2-2212823, 3rd Generation Partnership Project, Mobile Competence Centre, 650, Route Des Lucioles, F-06921, Sophia-Antipolis Cedex, France, vol. 3GPP RAN 2, No. Toulouse, FR, Nov. 14-Nov. 18, 2022, Nov. 4, 2022, XP052216891, 3 Pages, p. 1-p. 3.

Qualcomm Incorporated: "Connected Mode Mobility", 3GPP TSG-RAN WG2 Meeting #121 bise, R2-2302925, 3rd Generation Partnership Project, Mobile Competence Centre, 650, Route Des Lucioles, F-06921, Sophia-Antipolis Cedex, France, vol. RAN WG2, No. Online, Apr. 17-Mar. 12, 2023, Apr. 6, 2023, XP052365196, 5 Pages, p. 1-p. 5.

Qualcomm Incorporated: "Network energy saving techniques", 3GPP TSG-RAN WG3 Meeting #119-bis electronic, R2-2210369, 3rd Generation Partnership Project, Mobile Competence Centre, 650, Route Des Lucioles, F-06921, Sophia-Antipolis Cedex, France, vol. RAN WG3, No. electronic, Oct. 10-Oct. 19, 2022, Sep. 30, 2022, XP052263691, 5 Pages, p. 1-p. 5.

Vodafone: "CHO improvements for Network Energy Savings", 3GPP TSG-RAN WG2 Meeting #120, R2-2212273, 3rd Generation Partnership Project, Mobile Competence Centre, 650, Route Des Lucioles, F-06921, Sophia-Antipolis Cedex, France, vol. 3GPP RAN 2, No. Toulouse, FR, Nov. 14-Nov. 18, 2022, Nov. 3, 2022, XP052216357, 3 Pages, p. 1-p. 2.

* cited by examiner

TECHNIQUES FOR IMPROVING A NETWORK ENERGY SAVINGS MODE

BACKGROUND

Field of the Disclosure

Aspects of the present disclosure relate to wireless communications, and more particularly, to techniques for improving a network energy saving (NES) mode.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication at a first user equipment (UE). The method includes receiving, from a first network entity associated with a source cell, configuration information indicating one or more conditions for executing a conditional handover from the first network entity associated with the source cell to a second network entity associated with a target cell; receiving, from the first network entity associated with the source cell, a trigger signal including a trigger command for the conditional handover; and taking one or more actions related to executing the conditional handover based on the trigger signal and the one or more conditions.

Another aspect provides a method for wireless communication at a first network entity associated with a source cell. The method includes transmitting, to a first UE, configuration information indicating one or more conditions for executing a conditional handover from the first network entity associated with the source cell to a second network entity associated with a target cell; determining to enter a network energy saving (NES) mode; transmitting, to the first UE based on the determination to enter the NES mode, a trigger signal including a trigger command for the conditional handover; and taking one or more actions related to entering the NES mode based on trigger signal.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
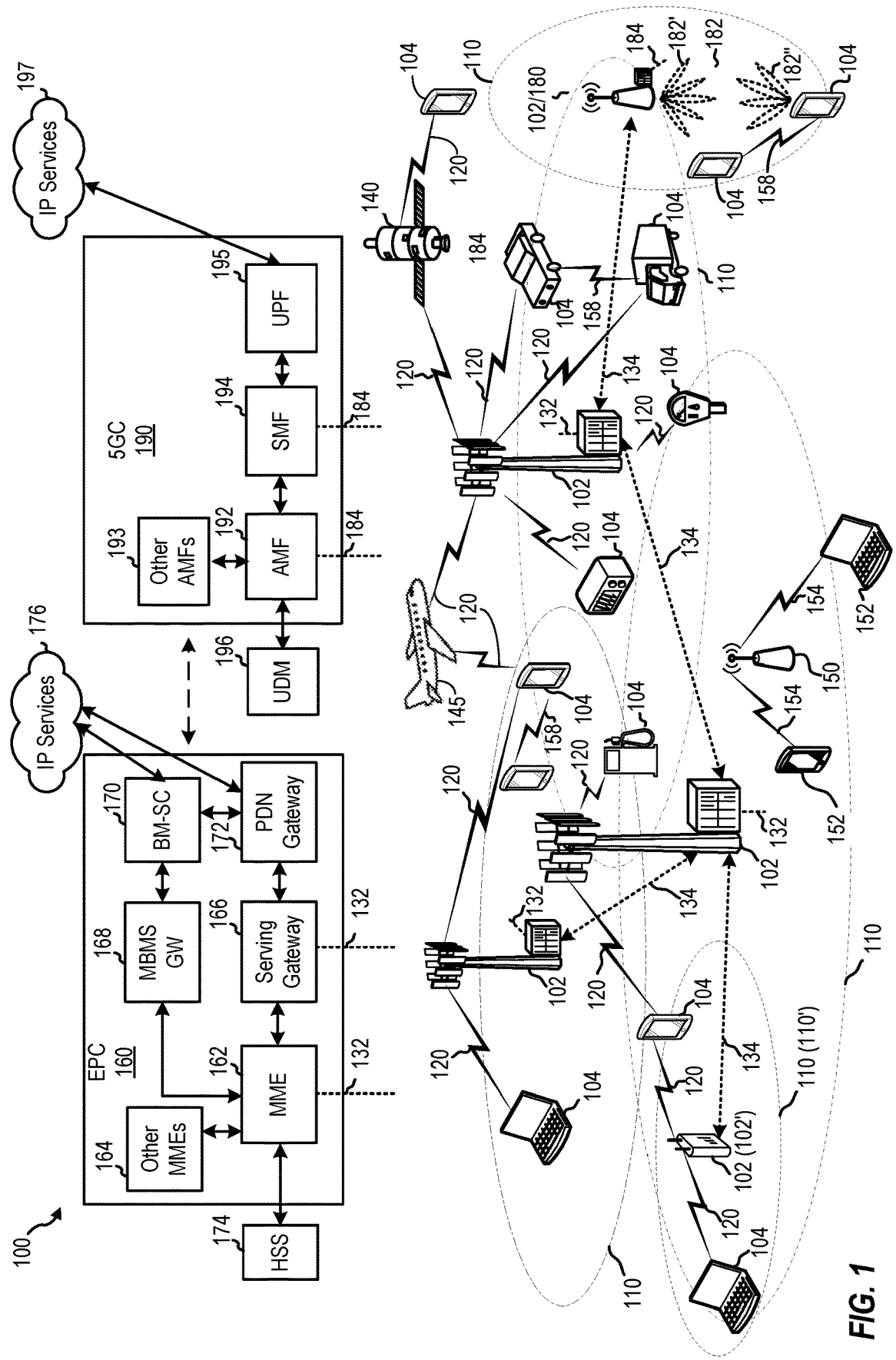
FIG. 1 depicts an example wireless communications network.

Aspects of the present disclosure provide apparatuses, methods, processing systems, and computer-readable mediums for improving a network energy saving (NES) mode.

Power consumption of network entities in large scale wireless networks (e.g., 4G, 5G, and beyond) is a primary concern. To help reduce this power consumption, certain network entities may be capable of operating in a network energy savings (NES) mode, allowing these network entities to power down certain components to save power. In some cases, however, while a first network entity may determine to enter the NES mode, there may still be user equipments (UEs) that are served by the first network entity. In such cases, the first network entity, which may be associated with a source cell, may take one or more actions to hand these UEs over to a second network entity associated with a target cell.

In some cases, a techniques known as a conditional handover may be used to hand these UEs over to the second network entity associated with the target cell. A conditional handover is a type of handover in which the first network entity associated with the serving cell provides a UE with a handover command/configuration that includes one or more triggering conditions that allows the UE to autonomously initiate a handover to the second network entity associated with the target cell.

Accordingly, in some cases, when the first network entity determines to enter the NES mode, the first network entity may transmit a trigger signal to one or more UEs, triggering them to evaluate the one or more triggering conditions and to execute a conditional handover to the second network entity when the one or more triggering conditions are satisfied. However, there may be cases in which not all of the UEs are able to be handed over to the second network entity. Thus, if the first network entity were to proceed with entering the NES mode, this would cause a radio link failure at the UEs that were unable to be handed over, resulting in poor user experience and wasted time-frequency and power resources associated with missed transmissions or receptions and corresponding retransmissions. Moreover, even if all of the UEs are able to be handed over to the second network entity, a large number of these UEs may end up transmitting random access channel (RACH) messages (e.g., to attach to the second network entity) at a same time, which may result in collisions between UEs. These collisions may result in RLF at these UEs, leading to wasted time-frequency and power resources.

Accordingly, aspects of the present disclosure provide techniques to help avoid these issues associated with using conditional handovers when the first network entity determines to enter a NES mode. For example, in some cases, the first network entity may configure different conditional handover execution timers for different UEs, staggering the times at which these UEs may transmit RACH messages to handover to the second network entity, thereby reducing collisions between UEs. Additionally, in some cases, the first network entity may delay entering the NES mode or may not enter the NES mode at all when at least one UE is unable to be handed over to the second network entity. Delaying or not entering the NES mode may thus allow these UEs to still be served by the first network entity, thereby avoiding RLF and associated wasted time-frequency and power resources.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
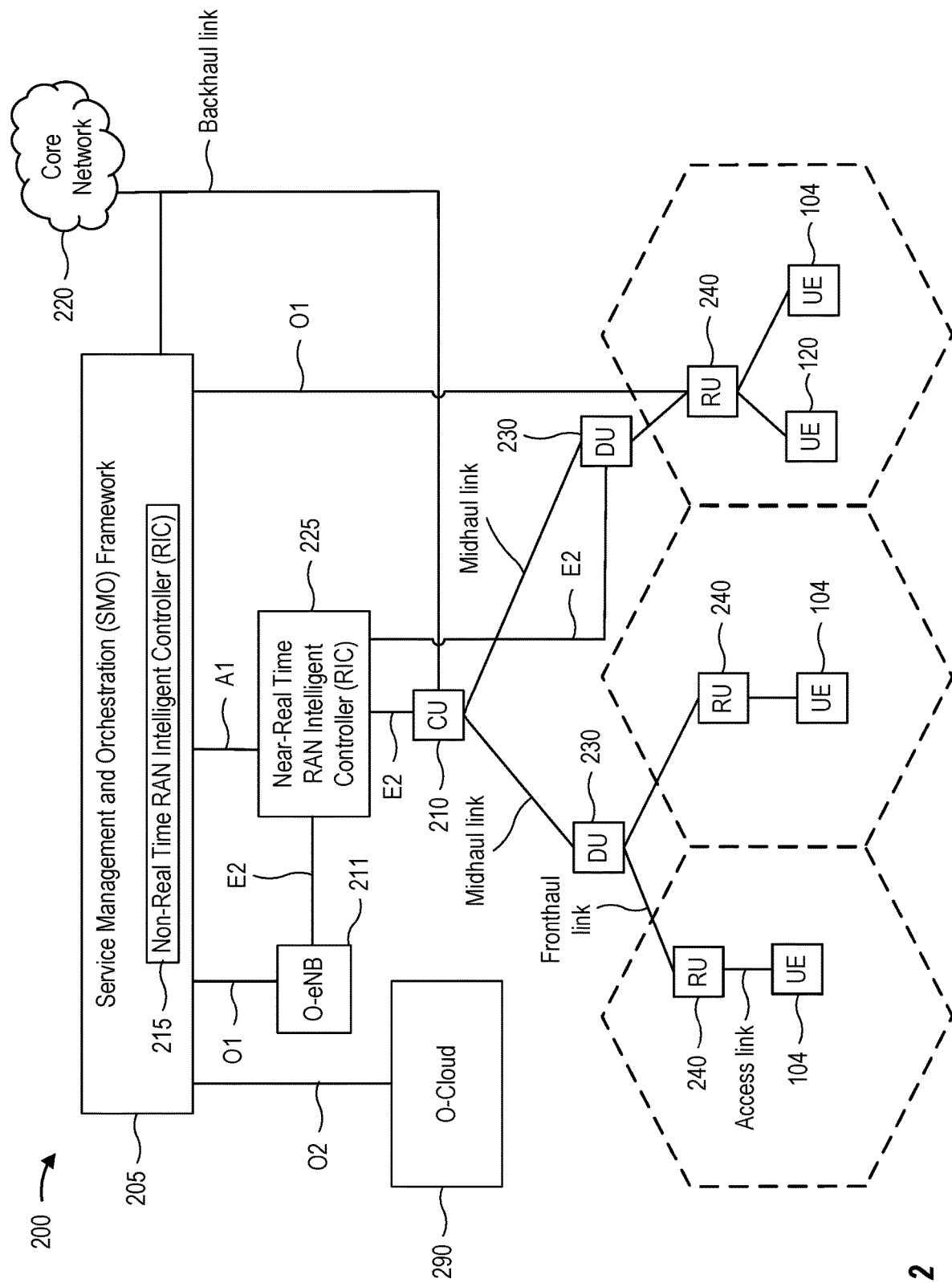
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHZ-7125 MHz, which is often referred to (interchangeably) as "Sub-6 GHz". Similarly, 3GPP currently defines Frequency Range 2 (FR2) as including 24,250 MHZ-71,000 MHZ, which is sometimes referred to (interchangeably) as a "millimeter wave" ("mmW" or "mmWave"). In some cases, FR2 may be further defined in terms of sub-ranges, such as a first sub-range FR2-1 including 24,250 MHz-52,600 MHz and a second sub-range FR2-2 including 52,600 MHz-71,000 MHz. A base station configured to communicate using mm Wave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUS) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUS 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
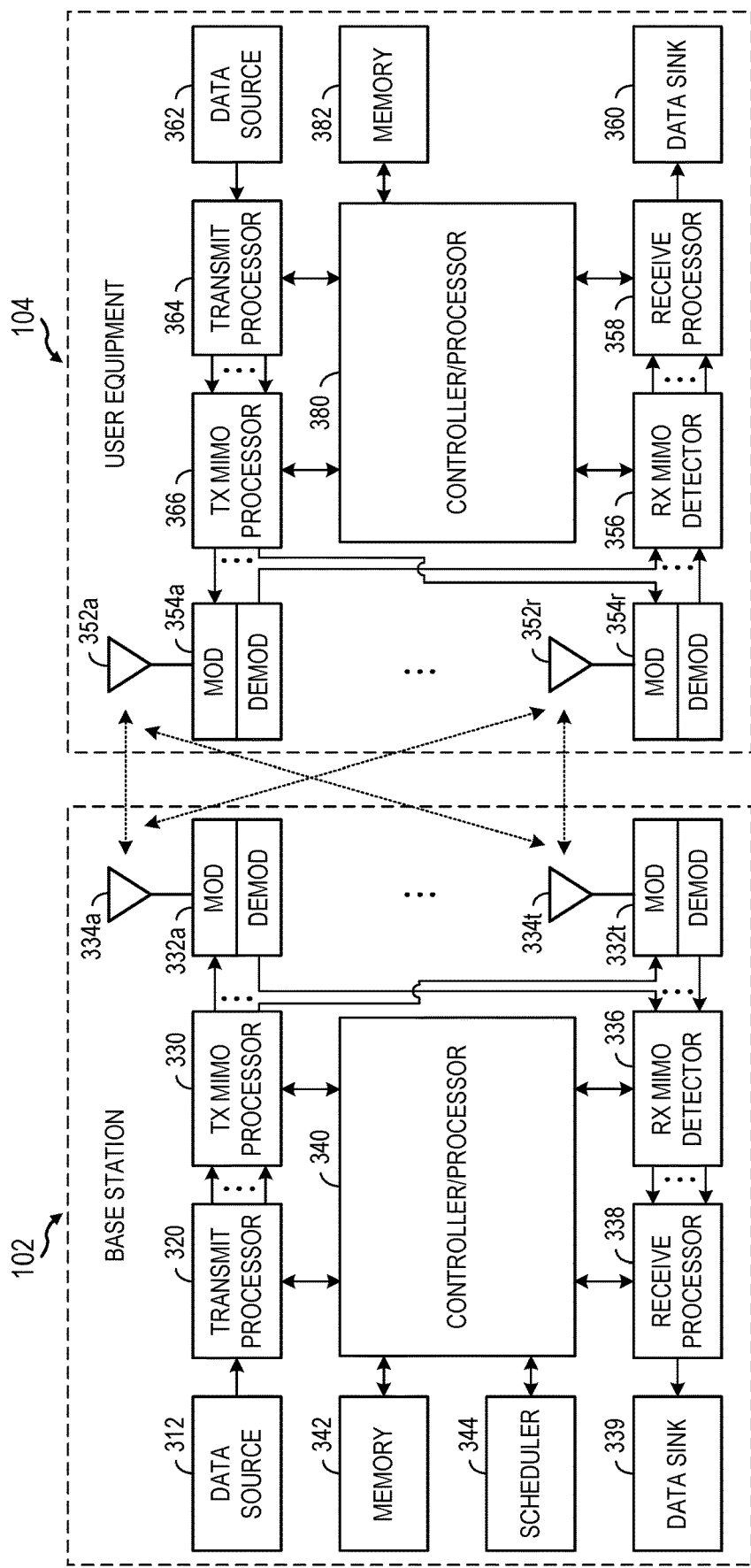
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4:
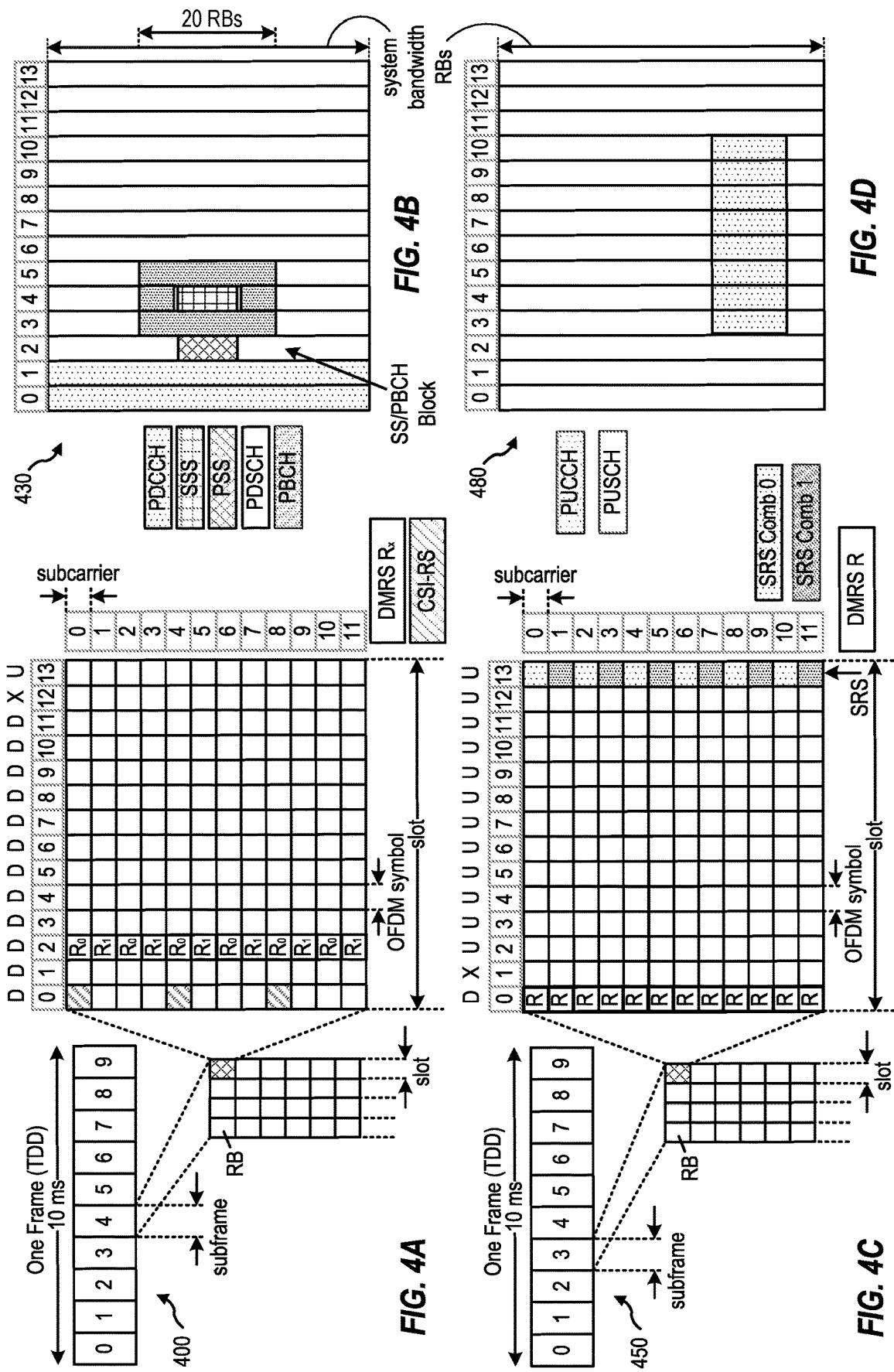
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram

450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 6 allow for 1, 2, 4, 8, 16, 32, and 64 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where u is the numerology 0 to 6. As such, the numerology μ=0 has a subcarrier spacing of 15 kHz and the numerology μ=6 has a subcarrier spacing of 960 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Improving a Network Entergy Saving (NES) Mode

Power consumption of network entities in large scale wireless networks (e.g., 4G, 5G, and beyond) is a primary concern. In some cases, these network entities (e.g., BS 102 described with respect to FIGS. 1 and 3 or a disaggregated BS as described with respect to FIG. 2) may use a Network Energy Savings (NES) mode to help reduce this power consumption. While operating in the NES mode, a network entity may be put into a sleep state, allowing one or more components of the network entity (e.g., power amplifiers, baseband processors, RF components, transmitters, receivers, transceivers, and the like) to be powered down and thereby reducing power consumption. In some cases, the network entity may decide to enter the NES mode when the network entity is not serving any user equipments (UEs), when there is little to no traffic associated with any served UEs, or when coverage provided by the network entity to any served UEs may be adequately provided by another network entity in the wireless network.

In some cases, when a first network entity determines to enter the NES mode, any UEs that are being served by the first network entity (e.g., that are in a radio resource control (RRC) connected mode) may need to be handed over to a second network entity. In this scenario, the first network entity that has determined to enter the NES mode may be associated with a source cell (e.g., the cell from which the UEs will be handed over) while the second network entity may be associated with a target cell (e.g., the cell that is being targeted for handing over the UEs from the source cell).

In some cases, a technique known as a conditional handover may be used to hand UEs over from the first network entity to the second network entity when the first network entity wants to transition into the NES mode. A conditional handover is a type of handover in which the first network entity associated with the serving cell provides a UE with a handover command/configuration that includes one or more triggering conditions that allows the UE to autonomously initiate a handover to the second network entity associated with the target cell. For example, upon receiving a conditional handover command/configuration, the UE may begin to monitor one or more candidate neighbor cells. If the UE detects that the one or more triggering conditions have been satisfied, the UE may autonomously initiate a handover to the second network entity associated with the target cell without further assistance from the first network entity associated with the serving cell.

Accordingly, for example, when used with a NES mode, the first network entity may provide configuration information to one or more UEs, indicating one or more conditions for executing a conditional handover to hand the one or more UEs over to the second network entity associated with the target cell. At some point after providing the configuration information to the one or more UEs, the first network entity may determine to enter the NES mode to save power and to offload the one or more UEs from the source cell. In response, the first network entity may transmit a trigger signal to the one or more UEs, triggering the one or more UEs to evaluate at least some of the one or more conditions for executing the conditional handover. If the one or more UEs determine that all of the one or more conditions have been satisfied, the one or more UEs may autonomously trigger a handover to the second network entity associated with the target cell. In some cases, conditional handovers may allow the first network entity to reduce signaling overhead associated with offloading the one or more UEs and to quickly enter into the NES mode.

While conditional handovers may allow the first network entity to reduce signaling overhead associated with offloading the one or more UEs, there may be instances in which some of the one or more UEs may not be able to discover a target cell that provides a sufficient quality of service (QOS). This may lead to radio link failure (RLF) for these UEs or a large degradation in QoS, resulting in wasted time-frequency resources in the wireless network and power resources at these UEs associated with failed transmissions or receptions by these UEs and corresponding retransmissions.

Further, in some cases, even if a second network entity associated with a target cell is available for the one or more UEs to be handed over to, a large number of these UEs may attempt to transmit random access channel (RACH) messages to the second network entity (e.g., in order to attach to the second network entity). This large number of RACH messages being transmitted at the same time may result in collisions between UEs and may lead to RLF for some of these UEs, degrading user experience and wasting time-frequency resources in the wireless network and power resources at these UEs.

Accordingly, aspects of the present disclosure provide techniques to help avoid these issues associated with using conditional handovers when the first network entity determines to enter a NES mode. For example, in some cases, these techniques may involve configuring one or more UEs with conditional handover execution timer. The conditional handover execution timers of the one or more UEs may be each be set to a different configured time-to-execute time value, specifying a different time for each UE to execute a conditional handover to a network entity associated with a target cell. These different configured time-to-execute time values may result in RACH messages from the one or more UEs being staggered in time, avoiding collisions between UEs and associated wasted time-frequency and power resources.

Additionally, the techniques presented herein may allow for the first network entity that has determined to enter the NES mode to delay or stop entering the NES mode when at least one of the one or more UEs is unable to be handed over to the second network entity. By delaying or not entering the NES mode at all, the UEs that are unable to be handed over to the second network entity may still be served by the first network entity, avoiding RLF for these UEs and associated wasted time-frequency and power resources described above. Moreover, while the first network entity may not be able to enter the NES mode, the first network entity may still have a lower load since at least some UEs may be able to successfully hand over to a target cell, thus reducing power consumption at the first network entity without completely powering off.

Example Operations of Entities in a Communications Network

Figure 5:
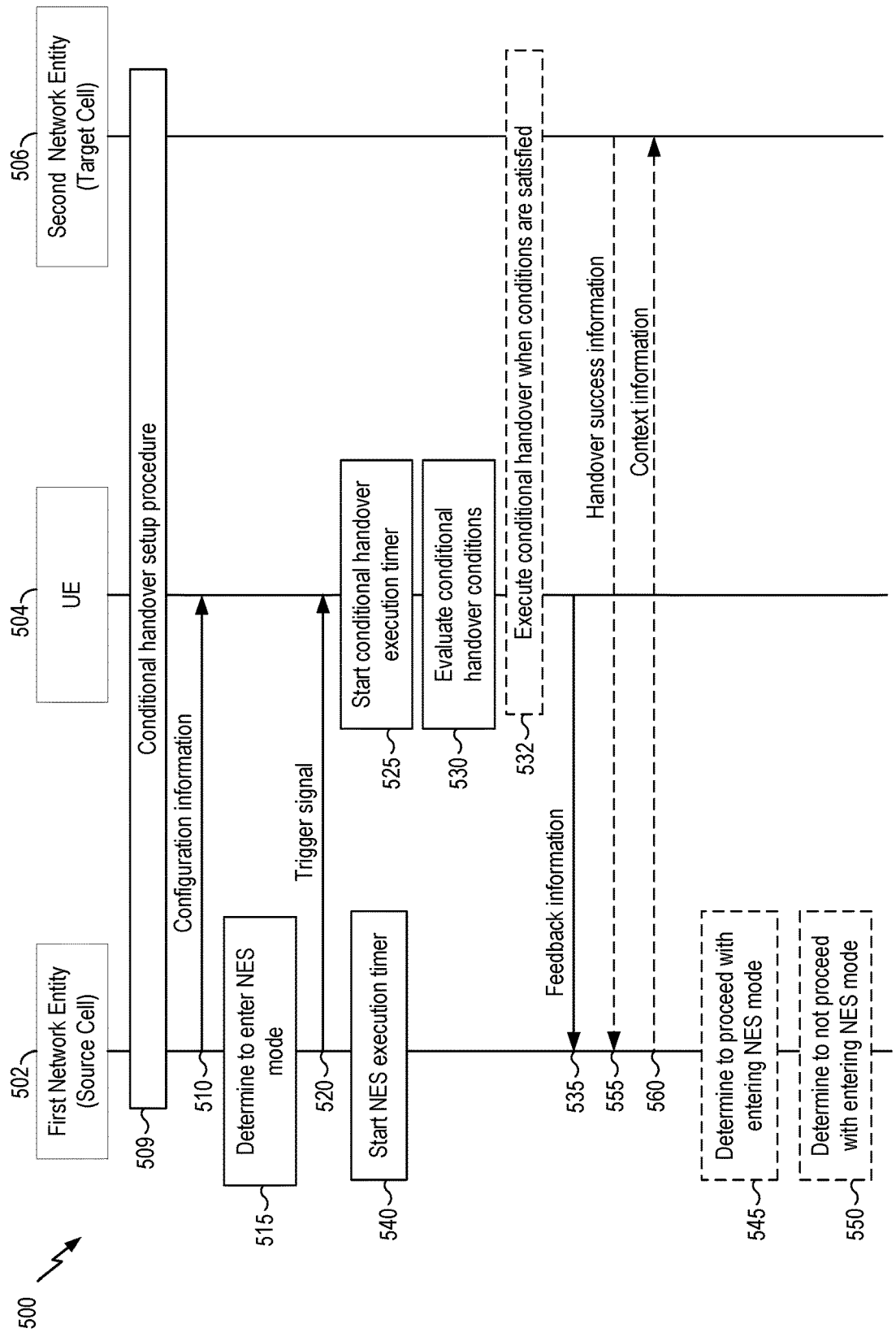
FIG. 5 depicts a process flow for communications in a network between a first network entity, a second network entity, and a user equipment.

FIG. 5 depicts a process flow including operations 500 for communications in a network between a first network entity 502, a first user equipment (UE) 504, and a second network entity 506. In some cases, the first network entity 502 may be associated with a source cell (e.g., a cell in which the first UE 504 is currently being served) and the second network entity 506 may be associated with a target cell (e.g., a cell that the first UE 504 may be handed over to). In some aspects, the first network entity 502 and the second network entity 506 may be examples of the BS 102 depicted and described with respect to FIGS. 1 and 3 or a disaggregated base station depicted and described with respect to FIG. 2. Similarly, the first UE 504 may be an example of UE 104 depicted and described with respect to FIGS. 1 and 3. However, in other aspects, first UE 504 may be another type of wireless communications device and the first network entity 502 and the second network entity 506 may be another types of network entity or network nodes, such as those described herein.

As shown, operations 500 may begin in step 509 with the first network entity 502, the second network entity 506, and the first UE 504 performing a conditional handover setup procedure. In some cases, conditional handover setup procedure may include steps 0-5 described with respect to FIG. 9.2.3.4.2-1 of Third Generation Partnership Project (3GPP) Technical Specification (TS) 38.300 version 17.3.0.

Thereafter, as shown in step 510 with the first UE 504 receiving, from the first network entity 502 associated with the source cell, configuration information indicating one or more conditions for executing a conditional handover from the first network entity 502 associated with the source cell to the second network entity 506 associated with the target cell. In some cases, the configuration information may be received in one or more fields of a radio resource control (RRC) message, including parameters defining the one or more conditions. In some cases, the first UE 504 may be configured to execute the conditional handover only when the one or more conditions are satisfied.

For example, in some cases, the one or more conditions may comprise one or more signal measurements for the second network entity 506 associated with the target cell being greater than or equal to a threshold. For example, the one or more signal measurements being greater than or equal to the threshold may indicate that the first UE 504 could be successfully handed over to, and served by, the second network entity 506 associated with the target cell. In some cases, the configuration information may further include an indication of the threshold for the one or more signal measurements. In some cases, the one or more signal measurements may comprise reference signal received power (RSRP) measurements associated with one or more synchronization signal blocks (SSBs) received from the second network entity 506 associated with the target cell. In some cases, rather than this condition involving the one or more signal measurements for the second network entity 506 being greater than or equal to a threshold, in some cases, this condition may involve the one or more signal measurements for the second network entity 506 being within a particular range or offset from signal measurements associated with the first network entity 502.

In some cases, the one or more conditions may comprise reception of a trigger signal for the conditional handover from the first network entity 502 associated with the source cell. As will be described below, the trigger signal may be used by the first network entity 502 to trigger one or more UEs, including first UE 504, to determine whether to handover to a network entity associated with a target cell, such as the second network entity 506.

In some cases, the one or more conditions may also comprise a conditional handover execution timer being expired following reception of the trigger signal. For example, the conditional handover execution timer may be used to define a time at which to execute or invoke the conditional handover to hand the first UE 504 over to the second network entity 506 associated with the target cell following reception of the trigger signal. In some cases, the conditional handover execution timer may have a starting time value set to a configured time-to-execute time value. In other words, the conditional handover execution timer may begin at the configured timer-to-execute time value and count down from there. In some cases, the configured time-to-execute time value may be received in the configuration information in step 510 or a trigger signal received from the first network entity 502 (e.g., as described below with respect to step 520).

Additionally, in some cases, to avoid a large number of UEs in the source cell transmitting RACH transmissions to the second network entity 506 associated with the target cell at a same time (e.g., which could result in collisions and RLF, as described above), the configured time-to-execute time value for the first UE 504 may be different from other configured time-to-execute time values, for executing conditional handovers, associated with other UEs in the source cell. In other words, the first network entity 502 may configure different time-to-execute time values for different UEs so that the time at which these UEs execute or invoke conditional handovers and begin transmitting RACH transmissions target cells is different, thereby reducing the chances of RACH message collision and RLF.

As shown in step 515, once the first UE 504 has received the configuration information from the first network entity 502 associated with the source cell, the first network entity 502 may determine to enter an NES mode to save power, as described above. In some cases, the first network entity 502 may determine to enter the NES mode when an amount of traffic being handled by the first network entity 502 is below a threshold, traffic associated with UEs served by the first network entity 502 (including the first UE 504) may be adequately handled by other network entities, such as the second network entity 606, or the first network entity 502 is otherwise underutilized.

Thereafter, as shown in step 520, the first network entity 502 transmits, to the first UE 504 based on the determination to enter the NES mode, a trigger signal including a trigger command for the conditional handover. In some cases, the trigger command may trigger the first UE 504 to start the conditional handover execution timer and to evaluate the one or more conditions for executing the conditional handover. In some cases, the trigger signal may include one bit for indicating the trigger command. In some cases, the trigger signal may comprise a layer 1 or layer 2 unicast message or a layer 1 broadcast or group message. More specifically, in some cases, the trigger signal comprises one of a unicast downlink control information (DCI) message (e.g., layer 1 signaling), a unicast a media access control-control element (MAC-CE) message (e.g., layer 2 signaling), or a broadcast group DCI message (e.g., layer 1 signaling).

Thereafter, the first UE 504 may take one or more actions related to executing the conditional handover based on the trigger signal and the one or more conditions, as described in greater detail below. Similarly, the first network entity 502 may also take one or more actions related to entering the NES mode based on trigger signal.

For example, as shown in step 525, taking the one or more actions may include the first UE 504 starting the conditional handover execution timer using the configured time-to-execute time value received in the configuration or the trigger signal. Thereafter, as shown in step 530, taking the one or more actions may further include the first UE 504 evaluating whether each of the one or more conditions are satisfied based on the reception of the trigger signal, for example, while the conditional handover execution timer is running. In some cases, the one or more conditions may be satisfied when (1) the one or more signal measurements associated with the target cell are greater than or equal to the threshold, (2) the first UE 504 has received the trigger signal for the conditional handover, and (3) the conditional handover execution timer has expired following reception of the trigger signal.

For example, in some cases, evaluating whether each of the one or more conditions are satisfied may include the first UE 504 determining whether one or more signal measurements associated with the target cell are greater than or equal to the threshold. In some cases, the one or more signal measurements comprise last available signal measurements associated with the target cell prior to reception of the trigger signal. In other words, the first UE 504 may rely on measurements that have already been performed associated with the target cell and determine whether these measurements are greater than or equal to the threshold.

In some cases, the first UE 504 may perform additional measurements associated with the target cell. For example, in some cases, taking the one or more actions may comprise the first UE 504 performing the one or more signal measurements associated with the target cell based on the reception of the trigger signal. In some cases, the first UE 504 may perform the one or more signal measurements prior to expiration of the conditional handover execution timer. In some cases, the first UE 504 may decide whether to perform the additional measurements, itself, or performing the additional measurements may be based on configuration information received from the first network entity 502 or stored within memory of the first UE 504 by a manufacturer or retailer of the first UE 504.

In some cases, when each of the one or more conditions are satisfied based on the evaluation (e.g., the one or more signal measurements are greater than or equal to the threshold, the first UE 504 has received the trigger signal, and the conditional handover execution timer has expired), the first UE 504 may then take action to execute the conditional handover to hand the first UE 504 over from the first network entity associated with the source cell to the second network entity 506 associated with the target cell. For example, as shown in step 532, the first UE 504 may execute the conditional handover with the second network entity 506 to hand the first UE 504 over from the first network entity to the second network entity 506. It should be noted that step 532 is illustrated using a dashed line to indicate that the first UE 504 may not always execute the conditional handover with the second network entity 506, such as when at least one of the one or more conditions are not satisfied.

In some cases, taking the one or more actions may further include the first UE 504 transmitting, based on the evaluation of whether each of the one or more conditions are satisfied, feedback information to the first network entity 502 associated with the source cell using a set of time-frequency resources, as shown in step 535. In some cases, the feedback information comprises hybrid automatic repeat request (HARQ) information and may be transmitted by the first UE 504 in transmitted in uplink control information (UCI) having a HARQ identifier associated with the conditional handover. In some cases, the HARQ information comprises an acknowledgement (ACK) indicating the UE is able to execute the conditional handover. In some cases, the HARQ information comprises a negative acknowledgement (NACK) indicating the UE is unable to execute the conditional handover.

The feedback information may be transmitted by the first UE 504 in different ways. For example, as will be described in greater detail below, the feedback information may be transmitted in at least one of a scheduling request, UCI on a PUCCH, a media access control-control element (MAC-CE) message, an RRC message, a random access channel (RACH) message.

In some cases, the set of time-frequency resources to use for transmitting the feedback information may be included within the configuration information received by the first UE 504 in step 515. In some cases, the set of time-frequency resources may be shared with a plurality of UEs in the source cell, including the first UE 504. When the set of time-frequency resources are shared with a plurality of UEs, the first UE 504 may determine a first subset of time-frequency resources, from the set of time-frequency resources, to use for transmitting the feedback information in different manners. For example, in some cases, the first UE 504 may perform a sensing operation to determine whether the first subset of time-frequency resources, of the set of time-frequency resources, are available for transmitting the feedback information. The first UE 504 may transmit the feedback information using the first subset of time-frequency resources when, based on the sensing operation, the first subset of time-frequency resources are available.

In some cases, when the set of time-frequency resources are shared with the plurality of UEs, the trigger signal may dynamically allocate different subsets of time-frequency resources to different UEs in the plurality of UEs in order to avoid interference between UEs when transmitting feedback information. For example, in some cases, the trigger signal may include an indication of the first subset of time-frequency resources, from the set of time-frequency resources, allocated to the first UE 504 for transmitting the feedback information. This first subset of time-frequency resources may be different from at least a second subset of time-frequency resources, from the set of time-frequency resources, allocated to a second UE of the plurality of UEs.

In some cases, when the trigger signal comprises a unicast message, the trigger signal may include a plurality of bits for indicating the trigger command and the first subset of time-frequency resources. In some cases, when the trigger signal comprises a broadcast or group message, the trigger signal may include a plurality of bits for indicating the trigger command, the first subset of time-frequency resources, and the second subset of time-frequency resources.

In some cases, prior to expiration of the conditional handover execution timer, the first UE 504 may transmit NACK information (e.g., a conditional handover NACK) indicating that at least one of the one or more conditions is not satisfied and that the first UE 504 cannot execute a conditional handover. For example, in some cases, if none of the one or more signal measurements associated with the target cell are greater than or equal to the threshold (e.g., all of the one or more signal measurements are below the threshold), this may signify that there are no good target cells for the first UE 504 to be handed over to. In this case, the first UE 504 may transmit the NACK information to inform the first network entity 502 that at least the signal measurement condition described above is not satisfied.

In some cases, the NACK information may be transmitted in different manners. For example, the first UE 504 may transmit the NACK information in UCI on a PUCCH. In some cases, the first UE 504 may transmit the NACK information transmitting the NACK information in a MAC-CE on a PUSCH.

In some cases, the first UE 504 may transmit the NACK information by transmitting a random access channel (RACH) transmission to the first network entity 502. In some cases, reception by the first network entity 502 of the RACH transmission from the first UE 504 may implicitly indicate to the first network entity 502 that the first UE 504 was unable to execute a conditional handover to the second network entity 506 associated with the target cell. In some cases, the RACH transmission may include an explicit indication that at least one of the one or more conditions is not satisfied and that the first UE 504 was unable to execute a conditional handover to the second network entity 506 associated with the target cell. In some cases, the first UE 504 may transmit the RACH transmission to indicate the NACK information when no transmission opportunity is present before expiration of the conditional handover execution timer or a scheduling request (SR) cannot be transmitted expiration of the conditional handover execution timer.

In some cases, the feedback information transmitted by the first UE 504 may comprise ACK information indicating that all conditions in the one or more conditions are satisfied. The ACK information may indicate to the first network entity 502 that the first UE 504 will proceed ahead with executing the conditional handover to hand the first UE 504 over from the first network entity 502 associated with the source cell to the second network entity 506 associated with the target cell.

As noted above, after transmitting the trigger signal in step 520, the first network entity 502 may take one or more actions related to entering the NES mode based on trigger signal. For example, in some cases, taking the one or more actions may include the first network entity 502 starting a NES execution timer, as shown in step 540. The NES execution timer may have a start time set to the time-to-execute time value for entering the NES mode. In some cases, the time-to-execute time value for entering the NES mode may comprise a value defining a time between transmission of the trigger signal and a time at which the first network entity 502 is configured to enter the NES mode.

In some cases, the time-to-execute time value for entering the NES mode may be greater than or equal to the configured time-to-execute time value for the conditional handover execution timer at the first UE 504. In some cases, setting the time-to-execute time value for entering the NES mode to be greater than or equal to the configured time-to-execute time value for the conditional handover execution timer at the first UE 504 may help to prevent scenarios in which the first network entity 502 inadvertently enters the NES mode when not all UEs in the source cell are able to complete a conditional handover to a target cell.

In some cases, in step 545, taking one or more actions related to entering the NES mode may include entering the NES mode upon expiration of the NES execution timer and without receiving NACK information from any UEs in the source cell, including the first UE 504. For example, in this scenario, when the first network entity 502 fails to receive NACK information from any UE in the source cell, including the first UE 504, the first network entity 502 may assume that all UEs were able to be offloaded from the source cell and handed over to a target cell, and that the first network entity 502 is safe to enter the NES mode. For example, in some cases, the first network entity 502, may be configured to power down one or more components, such as power amplifiers, baseband processors, RF components, transmitters, receivers, transceivers, and the like.

In some cases, however, the first network entity 502 may receive NACK information from the first UE 504, such as in the feedback information received in step 535. In such cases, taking the one or more actions related to entering the NES mode may comprise the first network entity 502 determining not to proceed with entering the NES mode, as shown in step 550. In other words, if the first network entity 502 receives a NACK from any UE in the source cell, the first network entity 502 may determine not to proceed with entering the NES mode in step 545.

In some cases, however, while the first network entity 502 may not be able to enter the NES mode, the first network entity 502 may still have a lower load (e.g., since at least some UEs may be able to successfully hand over to a target cell) and may thus reduce power without completely powering off. In some cases, the first network entity 502 may reconfigure the threshold for the one or more signal measurements and may retransmit the trigger signal. Lowering the threshold may allow any remaining UEs in the source cell to be handed over to a target cell.

As noted above, in some cases, the feedback information received from the first UE 504 may comprise ACK information indicating that all conditions in the one or more conditions for executing the conditional handover at the first UE 504 are satisfied. In some cases, the first network entity 502 may be configured to use this ACK information to make a determination of whether to proceed with entering the NES mode. For example, in some cases, to prevent a scenario in which the first network entity 502 prematurely enters the NES mode before all UEs are able to hand over to a target cell, the first network entity 502 may be configured to proceed ahead with entering the NES mode, as shown in step 550, after receiving ACK information from all connected UEs in the source cell, including the ACK information received from the first UE 504. In other words, to prevent the first network entity. In some cases, this may also help to avoid a scenario in which one or more UEs in the source cell do not receive the trigger signal correctly, such as when the trigger signal is transmitted as group or broadcast signaling. However, if the first network entity In some cases, as shown in step 555, the first network entity 502 may receive handover success information from one or more second network entities associated with one or more target cells, including the second network entity 506. In some cases, the first network entity 502 may delay entering the NES mode until the first network entity 502 receives the handover success information accounting for all UEs in (previously) in the source cell. For example, taking the one or more actions may involve the first network entity 502 entering the NES mode, in step 545, after receiving conditional handover success information for each UE of one or more UEs previously served by the first network entity 502 associated with the source cell, including the first UE 504. In some cases, the conditional handover success information may be received from one or more respective target cells associated with each UE of the one or more UEs, including the second network entity 506 associated with the target cell to which the first UE 504 is handed over. In some cases, in response to receiving the handover success information from the second network entity 506 associated with the target cell, the first network entity 502 may transmit context information for the first UE 504, as shown in step 560.

In some cases, the conditional handover success information may be received, from the second network entity associated with the target cell, in one handover success message. In some cases, the one handover success message may indicate respective conditional handover success information for multiple UEs, including the first UE 504. In some cases, the handover success message may indicate for which UEs a conditional handover has failed. In such cases, the first network entity 502 may decide not to enter the NES mode.

Example Operations of a User Equipment

Figure 6:
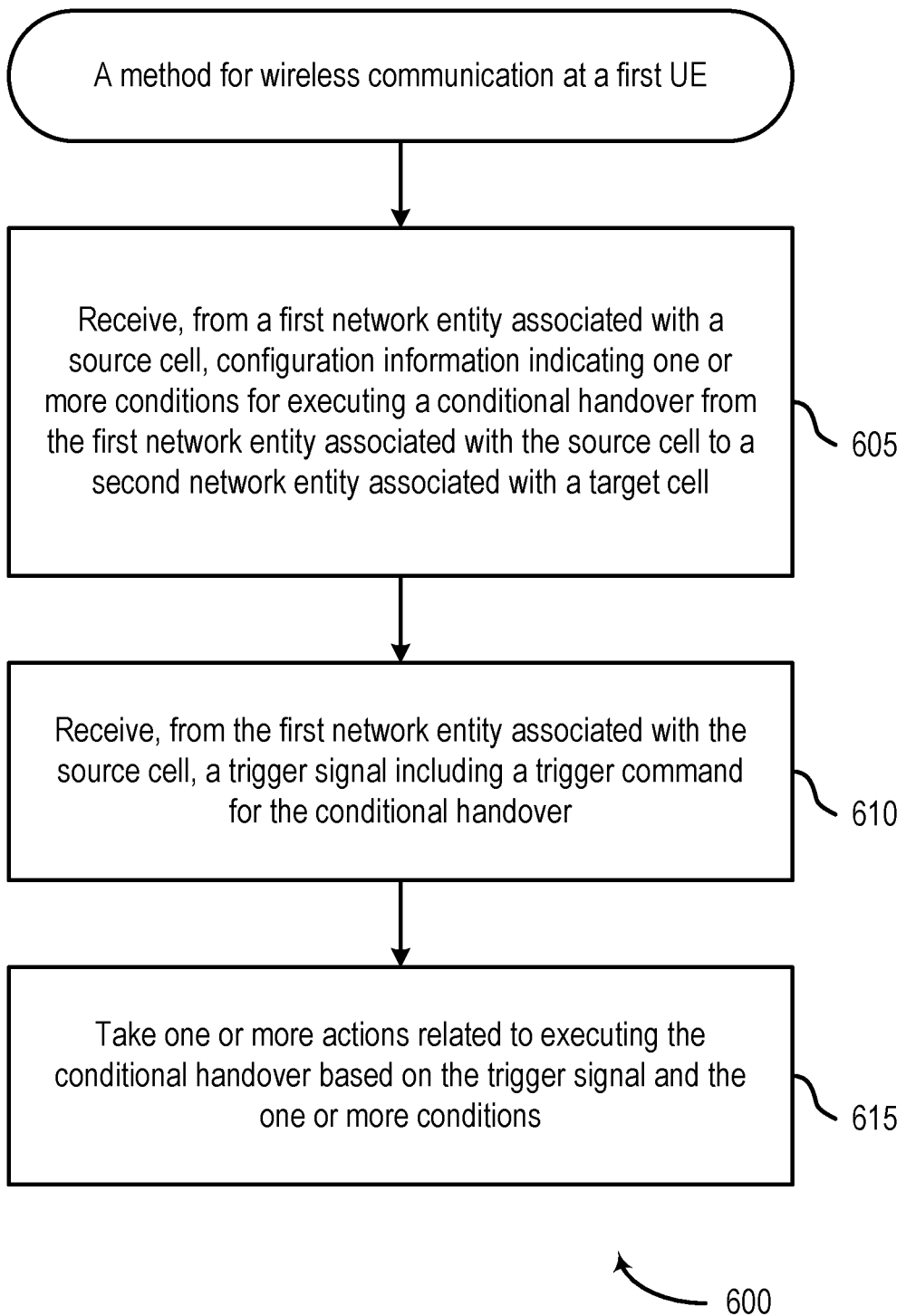
FIG. 6 depicts a method for wireless communications.

FIG. 6 shows an example of a method 600 of wireless communication at a first UE, such as a UE 104 of FIGS. 1 and 3 and/or the first UE 504 of FIG. 5

Method 600 begins at step 605 with receiving, from a first network entity associated with a source cell, configuration information indicating one or more conditions for executing a conditional handover from the first network entity associated with the source cell to a second network entity associated with a target cell. In some cases, the operations of this step refer to, or may be performed by, circuitry for receiving and/or code for receiving as described with reference to FIG. 8.

Method 600 then proceeds to step 610 with receiving, from the first network entity associated with the source cell, a trigger signal including a trigger command for the conditional handover. In some cases, the operations of this step refer to, or may be performed by, circuitry for receiving and/or code for receiving as described with reference to FIG. 8.

Method 600 then proceeds to step 615 with taking one or more actions related to executing the conditional handover based on the trigger signal and the one or more conditions. In some cases, the operations of this step refer to, or may be performed by, circuitry for taking and/or code for taking one or more actions as described with reference to FIG. 8.

In some aspects, the one or more conditions comprise: one or more signal measurements associated with the target cell being greater than or equal to a threshold; the reception of the trigger signal for the conditional handover; and a conditional handover execution timer has expired following reception of the trigger signal.

In some aspects, taking the one or more actions comprises starting the conditional handover execution timer based on reception of the trigger signal, wherein the conditional handover execution timer has starting time value set to a configured time-to-execute time value.

In some aspects, the configured time-to-execute time value is received in the configuration information or the trigger signal; and the configured time-to-execute time value is different from other configured time-to-execute time values, for executing conditional handovers, associated with other UEs in the source cell.

In some aspects, taking the one or more actions comprise evaluating whether each of the one or more conditions are satisfied based on the reception of the trigger signal.

In some aspects, when each of the one or more conditions are satisfied based on the evaluation, taking the one or more actions comprises executing the conditional handover to hand the UE over from the first network entity associated with the source cell to the second network entity associated with the target cell.

In some aspects, evaluating whether each of the one or more conditions are satisfied comprises determining whether the one or more signal measurements associated with the target cell are greater than or equal to the threshold.

In some aspects, the one or more signal measurements comprise last available signal measurements associated with the target cell prior to reception of the trigger signal.

In some aspects, taking the one or more actions further comprise performing, prior to expiration of the conditional handover execution timer, the one or more signal measurements associated with the target cell based on the reception of the trigger signal.

In some aspects, taking the one or more actions further comprise transmitting, based on the evaluation of whether each of the one or more conditions are satisfied, feedback information to the first network entity associated with the source cell using a set of time-frequency resources.

In some aspects, the feedback information comprises hybrid automatic repeat request (HARQ) information transmitted in uplink control information (UCI) and having a HARQ identifier associated with the conditional handover. In some aspects, the HARQ information comprises an acknowledgement (ACK) indicating the UE is able to execute the conditional handover. In some aspects, the HARQ information comprises an negative acknowledgement (NACK) indicating the UE is unable to execute the conditional handover.

In some aspects, the set of time-frequency resources is indicated in the configuration information.

In some aspects, the set of time-frequency resources are shared with a plurality of UEs in the source cell, including the first UE.

In some aspects, the method 600 further comprises performing a sensing operation to determine whether a first subset of time-frequency resources, of the set of time-frequency resources, are available for transmitting the feedback information. In some aspects, transmitting the feedback information comprises transmitting the feedback information using the first subset of time-frequency resources when, based on the sensing operation, the first subset of time-frequency resources are available.

In some aspects, based on the set of time-frequency resources being shared with the plurality of UEs, the trigger signal includes an indication of a first subset of time-frequency resources, from the set of time-frequency resources, allocated to the first UE for transmitting the feedback information.

In some aspects, the first subset of time-frequency resources is different from at least a second subset of time-frequency resources, from the set of time-frequency resources, allocated to a second UE.

In some aspects, when the trigger signal comprises a unicast message, the trigger signal includes a plurality of bits for indicating the trigger command and the first subset of time-frequency resources; and when the trigger signal comprises a broadcast or group message, the trigger signal includes a plurality of bits for indicating the trigger command, the first subset of time-frequency resources, and the second subset of time-frequency resources.

In some aspects, transmitting the feedback information comprises transmitting, prior to expiration of the conditional handover execution timer, NACK information indicating that at least one of the one or more conditions is not satisfied.

In some aspects, transmitting the NACK information comprises at least one of: transmitting the NACK information in UCI on a PUCCH; or transmitting the NACK information in a MAC-CE on a PUSCH.

In some aspects, transmitting the NACK information comprises transmitting a RACH transmission, wherein the RACH transmission indicates the NACK information.

In some aspects, transmitting the feedback information comprises transmitting ACK information indicating that all conditions in the one or more conditions are satisfied.

In some aspects, the trigger signal comprises one bit for indicating the trigger command.

In some aspects, the trigger signal comprises one of: a unicast DCI message; a unicast a MAC-CE message; or a broadcast group DCI message.

Figure 8:
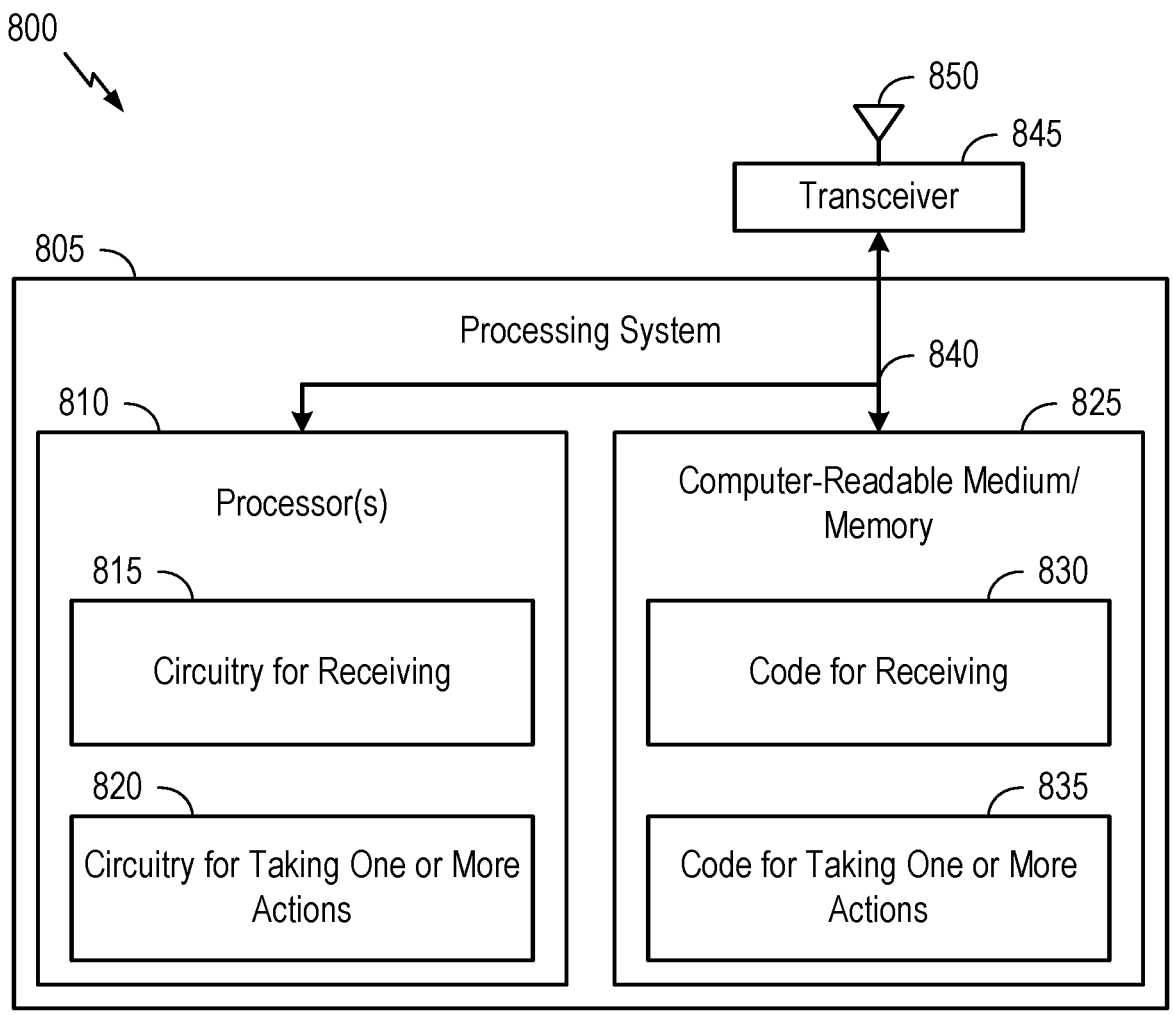
FIG. 8 depicts aspects of an example communications device.

In one aspect, method 600, or any aspect related to it, may be performed by an apparatus, such as communications device 800 of FIG. 8, which includes various components operable, configured, or adapted to perform the method 600. Communications device 800 is described below in further detail.

Note that FIG. 6 is just one example of a method, and other methods including fewer, additional, or alternative steps are possible consistent with this disclosure.

Example Operations of a Network Entity

Figure 7:
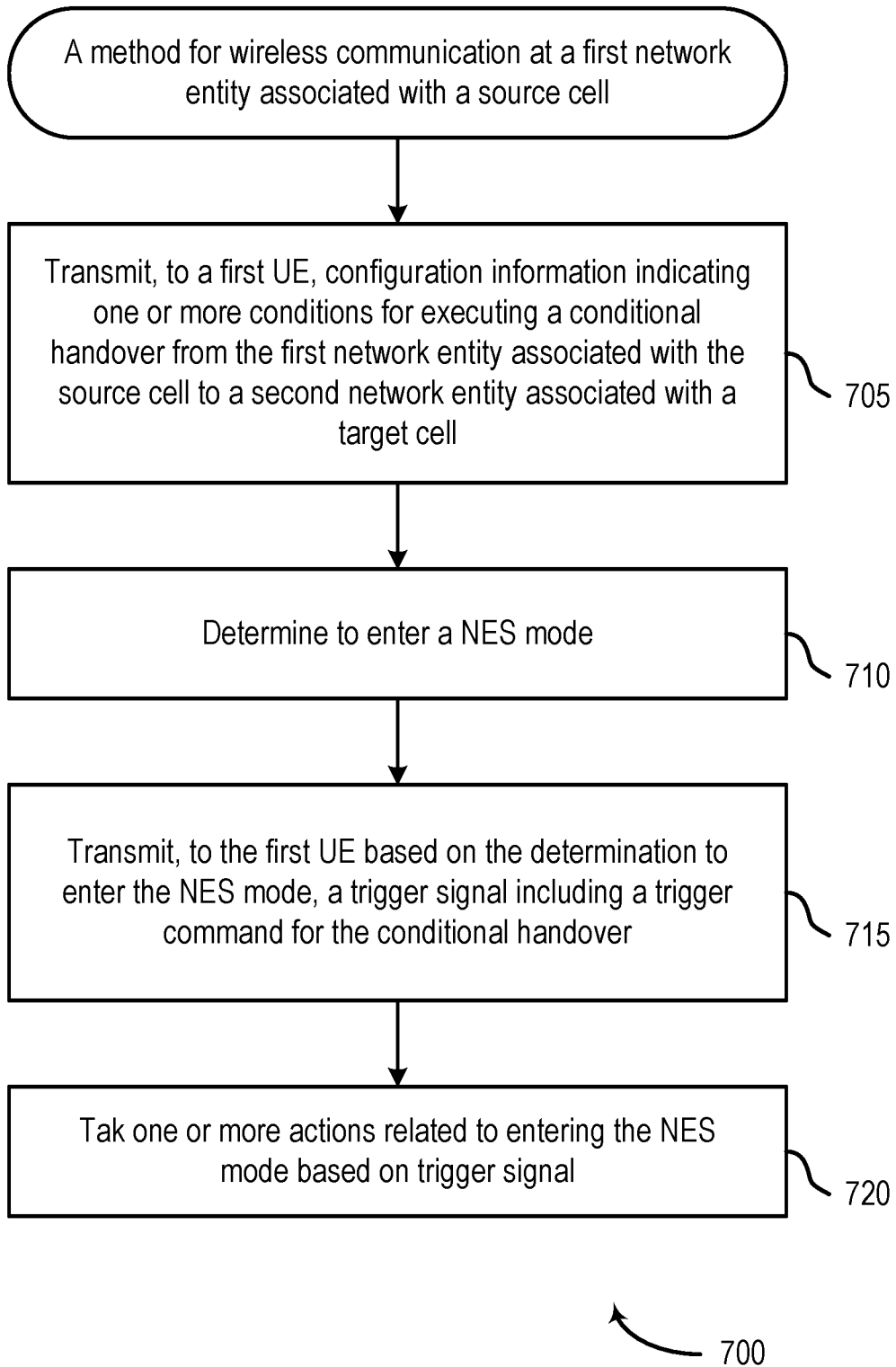
FIG. 7 depicts a method for wireless communications.

FIG. 7 shows an example of a method 700 of wireless communication at a first network entity associated with a source cell, such as the BS 102 of FIGS. 1 and 3, the first network entity 502 of FIG. 5, or a disaggregated base station as discussed with respect to FIG. 2.

Method 700 begins at step 705 with transmitting, to a first UE, configuration information indicating one or more conditions for executing a conditional handover from the first network entity associated with the source cell to a second network entity associated with a target cell. In some cases, the operations of this step refer to, or may be performed by, circuitry for transmitting and/or code for transmitting as described with reference to FIG. 9.

Method 700 then proceeds to step 710 with determining to enter a NES mode. In some cases, the operations of this step refer to, or may be performed by, circuitry for determining and/or code for determining as described with reference to FIG. 9.

Method 700 then proceeds to step 715 with transmitting, to the first UE based on the determination to enter the NES mode, a trigger signal including a trigger command for the conditional handover. In some cases, the operations of this step refer to, or may be performed by, circuitry for transmitting and/or code for transmitting as described with reference to FIG. 9.

Method 700 then proceeds to step 720 with taking one or more actions related to entering the NES mode based on trigger signal. In some cases, the operations of this step refer to, or may be performed by, circuitry for taking and/or code for taking one or more actions as described with reference to FIG. 9.

In some aspects, the one or more conditions comprise: one or more signal measurements associated with the target cell being greater than or equal to a threshold; the reception of the trigger signal for the conditional handover; and a conditional handover execution timer has expired following reception of the trigger signal at the first UE.

In some aspects, the conditional handover execution timer is based on a configured time-to-execute time value for the first UE; the configured time-to-execute time value is transmitted in the configuration information or the trigger signal; and the configured time-to-execute time value for the first UE is different from other configured time-to-execute time values, for executing conditional handovers, associated with other UEs in the source cell.

In some aspects, the configured time-to-execute time value for the first UE is less than or equal to a time-to-execute time value for entering the NES mode.

In some aspects, taking the one or more actions related to entering the NES mode comprises: starting a NES execution timer, wherein the NES execution timer has a start time set to the time-to-execute time value for entering the NES mode; and entering the NES mode upon expiration of the NES execution timer and without receiving NACK information from any UEs in the source cell, including the first UE.

In some aspects, the method 700 further includes receiving feedback information from the first UE using a set of time-frequency resources. In some cases, the operations of this step refer to, or may be performed by, circuitry for receiving and/or code for receiving as described with reference to FIG. 9.

In some aspects, the feedback information comprises hybrid automatic repeat request (HARQ) information received in uplink control information (UCI) and having a HARQ identifier associated with the conditional handover. In some aspects, the HARQ information comprises an acknowledgement (ACK) indicating the UE is able to execute the conditional handover. In some aspects, the HARQ information comprises an negative acknowledgement (NACK) indicating the UE is unable to execute the conditional handover.

In some aspects, the set of time-frequency resources is indicated in the configuration information.

In some aspects, the set of time-frequency resources are shared with a plurality of UEs in the source cell, including the first UE.

In some aspects, based on the set of time-frequency resources being shared with the plurality of UEs, the trigger signal includes an indication of a first subset of time-frequency resources, from the set of time-frequency resources, allocated to the first UE for transmitting the feedback information.

In some aspects, the first subset of time-frequency resources is different from at least a second subset of time-frequency resources, from the set of time-frequency resources, allocated to a second UE.

In some aspects, when the trigger signal comprises a unicast message, the trigger signal includes a plurality of bits for indicating the trigger command and the first subset of time-frequency resources; and when the trigger signal comprises a broadcast or group message, the trigger signal includes a plurality of bits for indicating the trigger command, the first subset of time-frequency resources, and the second subset of time-frequency resources.

In some aspects, receiving the feedback information comprises receiving NACK information indicating that at least one of the one or more conditions is not satisfied.

In some aspects, the NACK information is received from the first UE prior to expiration of a conditional handover execution timer associated with the first UE; and taking the one or more actions comprises not entering the NES mode based on the reception of the NACK information.

In some aspects, receiving the NACK information comprises at least one of: receiving the NACK information in UCI on a PUCCH; or receiving the NACK information in a MAC-CE on a PUSCH.

In some aspects, receiving the NACK information comprises receiving a RACH transmission from the first UE, wherein the RACH transmission indicates the NACK information.

In some aspects, receiving the feedback information comprises receiving ACK information from the first UE indicating that all conditions in the one or more conditions are satisfied.

In some aspects, taking the one or more actions comprises entering the NES mode after receiving ACK information from all connected UEs in the source cell, including the ACK information received from the first UE.

In some aspects, taking the one or more actions comprises entering the NES mode only after receiving conditional handover success information for each UE of one or more UEs previously served by the first network entity associated with the source cell, including the first UE.

In some aspects, the conditional handover success information is received from one or more respective target cells associated with each UE of the one or more UEs, including the target cell associated with the first UE.

In some aspects, the conditional handover success information is received, from the second network entity associated with the target cell, in one handover success message that indicates the conditional handover success information for multiple UEs, including the first UE.

In some aspects, the trigger signal comprises one bit for indicating the trigger command.

In some aspects, the trigger signal comprises one of: a unicast DCI message; a unicast MAC-CE message; or a broadcast group DCI message.

Figure 9:
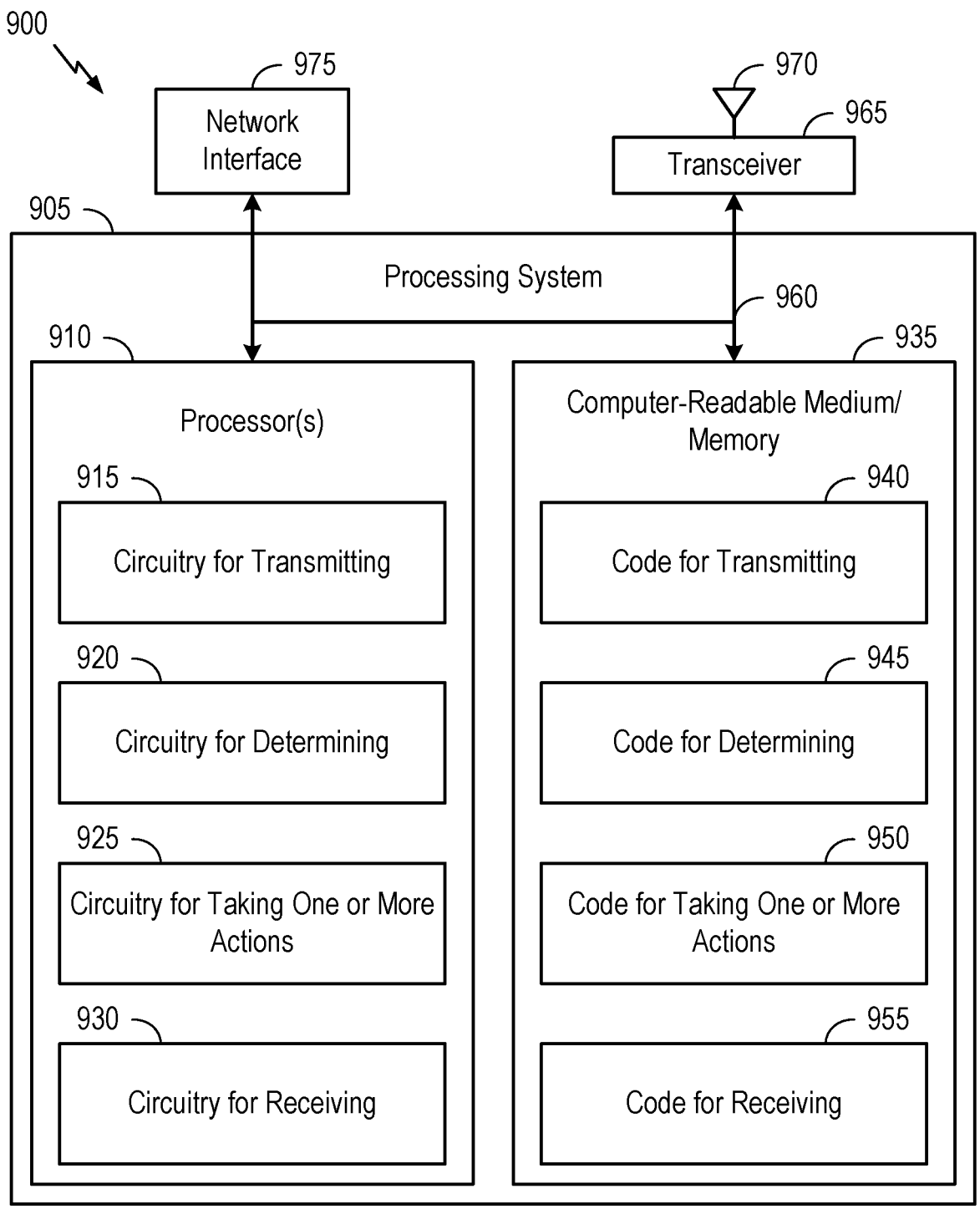
FIG. 9 depicts aspects of an example communications device.

In one aspect, method 700, or any aspect related to it, may be performed by an apparatus, such as communications device 900 of FIG. 9, which includes various components operable, configured, or adapted to perform the method 700. Communications device 900 is described below in further detail.

Note that FIG. 7 is just one example of a method, and other methods including fewer, additional, or alternative steps are possible consistent with this disclosure.

Example Communications Devices

FIG. 8 depicts aspects of an example communications device 800. In some aspects, communications device 800 is a user equipment, such as UE 104 described above with respect to FIGS. 1 and 3 and/or the first UE 504 described above with respect to FIG. 5.

The communications device 800 includes a processing system 805 coupled to the transceiver 845 (e.g., a transmitter and/or a receiver). The transceiver 845 is configured to transmit and receive signals for the communications device 800 via the antenna 850, such as the various signals as described herein. The processing system 805 may be configured to perform processing functions for the communications device 800, including processing signals received and/or to be transmitted by the communications device 800.

The processing system 805 includes one or more processors 810. In various aspects, the one or more processors 810 may be representative of one or more of receive processor 358, transmit processor 364, TX MIMO processor 366, and/or controller/processor 380, as described with respect to FIG. 3. The one or more processors 810 are coupled to a computer-readable medium/memory 825 via a bus 840. In certain aspects, the computer-readable medium/memory 825 is configured to store instructions (e.g., computer-executable code) that when executed by the one or more processors 810, cause the one or more processors 810 to perform the method 600 described with respect to FIG. 6, or any aspect related to it. Note that reference to a processor performing a function of communications device 800 may include one or more processors 810 performing that function of communications device 800.

In the depicted example, computer-readable medium/memory 825 stores code (e.g., executable instructions), such as code for receiving 830 and code for taking one or more actions 835. Processing of the code for receiving 830 and code for taking one or more actions 835 may cause the communications device 800 to perform the method 600 described with respect to FIG. 6, or any aspect related to it.

The one or more processors 810 include circuitry configured to implement (e.g., execute) the code stored in the computer-readable medium/memory 825, including circuitry such as circuitry for receiving 815 and circuitry for taking 820. Processing with circuitry for receiving 815 and circuitry for taking 820 may cause the communications device 800 to perform the method 600 described with respect to FIG. 6, or any aspect related to it.

Various components of the communications device 800 may provide means for performing the method 600 described with respect to FIG. 6, or any aspect related to it. For example, means for transmitting, sending or outputting for transmission may include transceivers 354 and/or antenna(s) 352 of the UE 104 illustrated in FIG. 3 and/or the transceiver 845 and the antenna 850 of the communications device 800 in FIG. 8. Means for receiving or obtaining may include transceivers 354 and/or antenna(s) 352 of the UE 104 illustrated in FIG. 3 and/or the transceiver 845 and the antenna 850 of the communications device 800 in FIG. 8.

FIG. 9 depicts aspects of an example communications device 900. In some aspects, communications device 900 is a network entity, such as BS 102 of FIGS. 1 and 3, the first network entity 502 described above with respect to FIG. 5, or a disaggregated base station as discussed with respect to FIG. 2.

The communications device 900 includes a processing system 905 coupled to the transceiver 965 (e.g., a transmitter and/or a receiver) and/or a network interface 975. The transceiver 965 is configured to transmit and receive signals for the communications device 900 via the antenna 970, such as the various signals as described herein. The network interface 975 is configured to obtain and send signals for the communications device 900 via communication link(s), such as a backhaul link, midhaul link, and/or fronthaul link as described herein, such as with respect to FIG. 2. The processing system 905 may be configured to perform processing functions for the communications device 900, including processing signals received and/or to be transmitted by the communications device 900.

The processing system 905 includes one or more processors 910. In various aspects, one or more processors 910 may be representative of one or more of receive processor 338, transmit processor 320, TX MIMO processor 330, and/or controller/processor 340, as described with respect to FIG. 3. The one or more processors 910 are coupled to a computer-readable medium/memory 935 via a bus 960. In certain aspects, the computer-readable medium/memory 935 is configured to store instructions (e.g., computer-executable code) that when executed by the one or more processors 910, cause the one or more processors 910 to perform the method 700 described with respect to FIG. 7, or any aspect related to it. Note that reference to a processor of communications device 900 performing a function may include one or more processors 910 of communications device 900 performing that function.

In the depicted example, the computer-readable medium/memory 935 stores code (e.g., executable instructions), such as code for transmitting 940, code for determining 945, code for taking one or more actions 950, and code for receiving 955. Processing of the code for transmitting 940, code for determining 945, code for taking one or more actions 950, and code for receiving 955 may cause the communications device 900 to perform the method 700 described with respect to FIG. 7, or any aspect related to it.

The one or more processors 910 include circuitry configured to implement (e.g., execute) the code stored in the computer-readable medium/memory 935, including circuitry such as circuitry for transmitting 915, circuitry for determining 920, circuitry for taking 925, and circuitry for receiving 930. Processing with circuitry for transmitting 915, circuitry for determining 920, circuitry for taking 925, and circuitry for receiving 930 may cause the communications device 900 to perform the method 700 described with respect to FIG. 7, or any aspect related to it.

Various components of the communications device 900 may provide means for performing the method 700 described with respect to FIG. 7, or any aspect related to it. Means for transmitting, sending or outputting for transmission may include transceivers 332 and/or antenna(s) 334 of the BS 102 illustrated in FIG. 3 and/or the transceiver 965 and the antenna 970 of the communications device 900 in FIG. 9. Means for receiving or obtaining may include transceivers 332 and/or antenna(s) 334 of the BS 102 illustrated in FIG. 3 and/or the transceiver 965 and the antenna 970 of the communications device 900 in FIG. 9.

Example Clauses

Implementation examples are described in the following numbered clauses:

Clause 1: A method for wireless communication at a first UE, comprising: receiving, from a first network entity associated with a source cell, configuration information indicating one or more conditions for executing a conditional handover from the first network entity associated with the source cell to a second network entity associated with a target cell; receiving, from the first network entity associated with the source cell, a trigger signal including a trigger command for the conditional handover; and taking one or more actions related to executing the conditional handover based on the trigger signal and the one or more conditions.

Clause 2: The method of Clause 1, wherein the one or more conditions comprise: one or more signal measurements associated with the target cell being greater than or equal to a threshold; the reception of the trigger signal for the conditional handover; and a conditional handover execution timer has expired following reception of the trigger signal.

Clause 3: The method of Clause 2, wherein taking the one or more actions comprises starting the conditional handover execution timer based on reception of the trigger signal, wherein the conditional handover execution timer has starting time value set to a configured time-to-execute time value.

Clause 4: The method of Clause 3, wherein: the configured time-to-execute time value is received in the configuration information or the trigger signal; and the configured time-to-execute time value is different from other configured time-to-execute time values, for executing conditional handovers, associated with other UEs in the source cell.

Clause 5: The method of any one of Clauses 3-4, wherein taking the one or more actions comprise evaluating whether each of the one or more conditions are satisfied based on the reception of the trigger signal.

Clause 6: The method of Clause 5, wherein, when each of the one or more conditions are satisfied based on the evaluation, taking the one or more actions comprises executing the conditional handover to hand the UE over from the first network entity associated with the source cell to the second network entity associated with the target cell.

Clause 7: The method of any one of Clauses 5-6, wherein evaluating whether each of the one or more conditions are satisfied comprises determining whether the one or more signal measurements associated with the target cell are greater than or equal to the threshold.

Clause 8: The method of Clause 7, wherein the one or more signal measurements comprise last available signal measurements associated with the target cell prior to reception of the trigger signal.

Clause 9: The method of Clause 7, wherein taking the one or more actions further comprise performing, prior to expiration of the conditional handover execution timer, the one or more signal measurements associated with the target cell based on the reception of the trigger signal.

Clause 10: The method of any one of Clauses 5-9, wherein taking the one or more actions further comprise transmitting, based on the evaluation of whether each of the one or more conditions are satisfied, feedback information to the first network entity associated with the source cell using a set of time-frequency resources.

Clause 11: The method of Clause 10, wherein: the feedback information comprises hybrid automatic repeat request (HARQ) information transmitted in uplink control information (UCI) and having a HARQ identifier associated with the conditional handover; the HARQ information comprises an acknowledgement (ACK) indicating the UE is able to execute the conditional handover; and the HARQ information comprises an negative acknowledgement (NACK) indicating the UE is unable to execute the conditional handover.

Clause 12: The method of any one of Clauses 10-11, wherein the set of time-frequency resources is indicated in the configuration information.

Clause 13: The method of any one of Clauses 10-12, wherein the set of time-frequency resources are shared with a plurality of UEs in the source cell, including the first UE.

Clause 14: The method of Clause 13, performing a sensing operation to determine whether a first subset of time-frequency resources, of the set of time-frequency resources, are available for transmitting the feedback information, wherein transmitting the feedback information comprises transmitting the feedback information using the first subset of time-frequency resources when, based on the sensing operation, the first subset of time-frequency resources are available.

Clause 15: The method of Clause 13, wherein, based on the set of time-frequency resources being shared with the plurality of UEs, the trigger signal includes an indication of a first subset of time-frequency resources, from the set of time-frequency resources, allocated to the first UE for transmitting the feedback information.

Clause 16: The method of Clause 15, wherein the first subset of time-frequency resources is different from at least a second subset of time-frequency resources, from the set of time-frequency resources, allocated to a second UE.

Clause 17: The method of Clause 16, wherein: when the trigger signal comprises a unicast message, the trigger signal includes a plurality of bits for indicating the trigger command and the first subset of time-frequency resources; and when the trigger signal comprises a broadcast or group message, the trigger signal includes a plurality of bits for indicating the trigger command, the first subset of time-frequency resources, and the second subset of time-frequency resources.

Clause 18: The method of any one of Clauses 10-17, wherein transmitting the feedback information comprises transmitting, prior to expiration of the conditional handover execution timer, NACK information indicating that at least one of the one or more conditions is not satisfied.

Clause 19: The method of Clause 18, wherein transmitting the NACK information comprises at least one of: transmitting the NACK information in UCI on a PUCCH; or transmitting the NACK information in a MAC-CE on a PUSCH.

Clause 20: The method of Clause 18, wherein transmitting the NACK information comprises transmitting a RACH transmission, wherein the RACH transmission indicates the NACK information.

Clause 21: The method of any one of Clauses 10-17, wherein transmitting the feedback information comprises transmitting ACK information indicating that all conditions in the one or more conditions are satisfied.

Clause 22: The method of any one of Clauses 1-21, wherein the trigger signal comprises one bit for indicating the trigger command.

Clause 23: The method of any one of Clauses 1-22, wherein the trigger signal comprises one of: a unicast DCI message; a unicast a MAC-CE message; or a broadcast group DCI message.

Clause 24: A method for wireless communication at a first network entity associated with a source cell, comprising: transmitting, to a first UE, configuration information indicating one or more conditions for executing a conditional handover from the first network entity associated with the source cell to a second network entity associated with a target cell; determining to enter a NES mode; transmitting, to the first UE based on the determination to enter the NES mode, a trigger signal including a trigger command for the conditional handover; and taking one or more actions related to entering the NES mode based on trigger signal.

Clause 25: The method of Clause 24, wherein the one or more conditions comprise: one or more signal measurements associated with the target cell being greater than or equal to a threshold; the reception of the trigger signal for the conditional handover; and a conditional handover execution timer has expired following reception of the trigger signal at the first UE.

Clause 26: The method of Clause 25, wherein: the conditional handover execution timer is based on a configured time-to-execute time value for the first UE; the configured time-to-execute time value is transmitted in the configuration information or the trigger signal; and the configured time-to-execute time value for the first UE is different from other configured time-to-execute time values, for executing conditional handovers, associated with other UEs in the source cell.

Clause 27: The method of Clause 26, wherein the configured time-to-execute time value for the first UE is less than or equal to a time-to-execute time value for entering the NES mode.

Clause 28: The method of Clause 27, wherein taking the one or more actions related to entering the NES mode comprises: starting a NES execution timer, wherein the NES execution timer has a start time set to the time-to-execute time value for entering the NES mode; and entering the NES mode upon expiration of the NES execution timer and without receiving NACK information from any UEs in the source cell, including the first UE.

Clause 29: The method of any one of Clauses 24-28, further comprising receiving feedback information from the first UE using a set of time-frequency resources.

Clause 30: The method of Clause 29, wherein: the feedback information comprises hybrid automatic repeat request (HARQ) information received in uplink control information (UCI) and having a HARQ identifier associated with the conditional handover; the HARQ information comprises an acknowledgement (ACK) indicating the UE is able to execute the conditional handover; and the HARQ information comprises an negative acknowledgement (NACK) indicating the UE is unable to execute the conditional handover.

Clause 31: The method of any one of Clauses 29-30, wherein the set of time-frequency resources is indicated in the configuration information.

Clause 32: The method of any one of Clauses 29-31, wherein the set of time-frequency resources are shared with a plurality of UEs in the source cell, including the first UE.

Clause 33: The method of Clause 32, wherein, based on the set of time-frequency resources being shared with the plurality of UEs, the trigger signal includes an indication of a first subset of time-frequency resources, from the set of time-frequency resources, allocated to the first UE for transmitting the feedback information.

Clause 34: The method of Clause 33, wherein the first subset of time-frequency resources is different from at least a second subset of time-frequency resources, from the set of time-frequency resources, allocated to a second UE.

Clause 35: The method of Clause 34, wherein: when the trigger signal comprises a unicast message, the trigger signal includes a plurality of bits for indicating the trigger command and the first subset of time-frequency resources; and when the trigger signal comprises a broadcast or group message, the trigger signal includes a plurality of bits for indicating the trigger command, the first subset of time-frequency resources, and the second subset of time-frequency resources.

Clause 36: The method of any one of Clauses 29-35, wherein receiving the feedback information comprises receiving NACK information indicating that at least one of the one or more conditions is not satisfied.

Clause 37: The method of Clause 36, wherein: the NACK information is received from the first UE prior to expiration of a conditional handover execution timer associated with the first UE; and taking the one or more actions comprises not entering the NES mode based on the reception of the NACK information.

Clause 38: The method of any one of Clauses 36-37, wherein receiving the NACK information comprises at least one of: receiving the NACK information in UCI on a PUCCH; or receiving the NACK information in a MAC-CE on a PUSCH.

Clause 39: The method of any one of Clauses 36-37, wherein receiving the NACK information comprises receiving a RACH transmission from the first UE, wherein the RACH transmission indicates the NACK information.

Clause 40: The method of any one of Clauses 29-35, wherein receiving the feedback information comprises receiving ACK information from the first UE indicating that all conditions in the one or more conditions are satisfied.

Clause 41: The method of Clause 40, wherein taking the one or more actions comprises entering the NES mode after receiving ACK information from all connected UEs in the source cell, including the ACK information received from the first UE.

Clause 42: The method of any one of Clauses 24-41, wherein taking the one or more actions comprises entering the NES mode only after receiving conditional handover success information for each UE of one or more UEs previously served by the first network entity associated with the source cell, including the first UE.

Clause 43: The method of Clause 42, wherein the conditional handover success information is received from one or more respective target cells associated with each UE of the one or more UEs, including the target cell associated with the first UE.

Clause 44: The method of Clause 42, wherein the conditional handover success information is received, from the second network entity associated with the target cell, in one handover success message that indicates the conditional handover success information for multiple UEs, including the first UE.

Clause 45: The method of any one of Clauses 24-44, wherein the trigger signal comprises one bit for indicating the trigger command.

Clause 46: The method of any one of Clauses 24-45, wherein the trigger signal comprises one of: a unicast DCI message; a unicast a MAC-CE message; or a broadcast group DCI message.

Clause 47: An apparatus, comprising: a memory comprising executable instructions; and a processor configured to execute the executable instructions and cause the apparatus to perform a method in accordance with any one of Clauses 1-46.

Clause 48: An apparatus, comprising means for performing a method in accordance with any one of Clauses 1-46.

Clause 49: A non-transitory computer-readable medium comprising executable instructions that, when executed by a processor of an apparatus, cause the apparatus to perform a method in accordance with any one of Clauses 1-46.

Clause 50: A computer program product embodied on a computer-readable storage medium comprising code for performing a method in accordance with any one of Clauses 1-46.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a first user equipment (UE), comprising:
    receiving, from a first network entity associated with a source cell, configuration information indicating one or more conditions for executing a conditional handover from the first network entity associated with the source cell to a second network entity associated with a target cell;
    receiving, from the first network entity associated with the source cell, a trigger signal including a trigger command for the conditional handover; and
    taking one or more actions related to executing the conditional handover based on the trigger signal and the one or more conditions, wherein the one or more conditions comprise at least a conditional handover execution timer expiring following reception of the trigger signal.

2. The method of claim 1, wherein the one or more conditions further comprise:
    one or more signal measurements associated with the target cell being greater than or equal to a threshold; and
    the reception of the trigger signal for the conditional handover.

3. The method of claim 2, wherein taking the one or more actions comprises:
    starting the conditional handover execution timer based on reception of the trigger signal, wherein the conditional handover execution timer has starting time value set to a configured time-to-execute time value; and evaluating whether each of the one or more conditions are satisfied based on the reception of the trigger signal.

4. The method of claim 3, wherein:
the configured time-to-execute time value is received in the configuration information or the trigger signal; and
the configured time-to-execute time value is different from other configured time-to-execute time values, for executing conditional handovers, associated with other UEs in the source cell.

5. The method of claim 3, wherein, when each of the one or more conditions are satisfied based on the evaluation, taking the one or more actions comprises executing the conditional handover to hand the UE over from the first network entity associated with the source cell to the second network entity associated with the target cell.

6. The method of claim 3, wherein:
evaluating whether each of the one or more conditions are satisfied comprises determining whether the one or more signal measurements associated with the target cell are greater than or equal to the threshold; and
one of:
the one or more signal measurements comprise last available signal measurements associated with the target cell prior to reception of the trigger signal; or
taking the one or more actions further comprise performing, prior to expiration of the conditional handover execution timer, the one or more signal measurements associated with the target cell based on the reception of the trigger signal.

7. The method of claim 3, wherein:
taking the one or more actions further comprise transmitting, based on the evaluation of whether each of the one or more conditions are satisfied, feedback information to the first network entity associated with the source cell using a set of time-frequency resources; and
the set of time-frequency resources is indicated in the configuration information.

8. The method of claim 7, wherein:
the feedback information comprises hybrid automatic repeat request (HARQ) information transmitted in uplink control information (UCI) and having a HARQ identifier associated with the conditional handover;
the HARQ information comprises an acknowledgement (ACK) indicating the UE is able to execute the conditional handover; and
the HARQ information comprises an negative acknowledgement (NACK) indicating the UE is unable to execute the conditional handover.

9. The method of claim 7, wherein the set of time-frequency resources are shared with a plurality of UEs in the source cell, including the first UE.

10. The method of claim 9, further comprising performing a sensing operation to determine whether a first subset of time-frequency resources, of the set of time-frequency resources, are available for transmitting the feedback information, wherein transmitting the feedback information comprises transmitting the feedback information using the first subset of time-frequency resources when, based on the sensing operation, the first subset of time-frequency resources are available.

11. The method of claim 9, wherein:
based on the set of time-frequency resources being shared with the plurality of UEs, the trigger signal includes an indication of a first subset of time-frequency resources, from the set of time-frequency resources, allocated to the first UE for transmitting the feedback information; and the first subset of time-frequency resources is different from at least a second subset of time-frequency resources, from the set of time-frequency resources, allocated to a second UE.

12. The method of claim 7, wherein:
transmitting the feedback information comprises transmitting, prior to expiration of the conditional handover execution timer, negative acknowledgement (NACK) information indicating that at least one of the one or more conditions is not satisfied; and
transmitting the NACK information comprises at least one of:
transmitting the NACK information in uplink control information (UCI) on a physical uplink control channel (PUCCH);
transmitting the NACK information in a media access control-control element (MAC-CE) on a physical uplink shared channel (PUSCH); or
transmitting a random access channel (RACH) transmission, wherein the RACH transmission indicates the NACK information.

13. The method of claim 7, wherein transmitting the feedback information comprises transmitting acknowledgement (ACK) information indicating that all conditions in the one or more conditions are satisfied.

14. The method of claim 1, wherein the trigger signal comprises one of:
a unicast downlink control information (DCI) message;
a unicast a media access control-control element (MAC-CE) message; or
a broadcast group downlink control information (DCI) message.

15. A method for wireless communication at a first network entity associated with a source cell, comprising:
transmitting, to a first user equipment (UE), configuration information indicating one or more conditions for executing a conditional handover from the first network entity associated with the source cell to a second network entity associated with a target cell;
determining to enter a network energy saving (NES) mode;
transmitting, to the first UE based on the determination to enter the NES mode, a trigger signal including a trigger command for the conditional handover; and
taking one or more actions related to entering the NES mode based on trigger signal, wherein the one or more conditions comprise at least a conditional handover execution timer expiring following reception of the trigger signal.

16. The method of claim 15, wherein the one or more conditions further comprise:
one or more signal measurements associated with the target cell being greater than or equal to a threshold; and
the reception of the trigger signal for the conditional handover.

17. The method of claim 16, wherein:
the conditional handover execution timer is based on a configured time-to-execute time value for the first UE;
the configured time-to-execute time value is transmitted in the configuration information or the trigger signal; and
the configured time-to-execute time value for the first UE is different from other configured time-to-execute time values, for executing conditional handovers, associated with other UEs in the source cell.

18. The method of claim 17, wherein:
the configured time-to-execute time value for the first UE is less than or equal to a time-to-execute time value for entering the NES mode; and
taking the one or more actions related to entering the NES mode comprises:
starting a NES execution timer, wherein the NES execution timer has a start time set to the time-to-execute time value for entering the NES mode; and
entering the NES mode upon expiration of the NES execution timer and without receiving negative acknowledgement (NACK) information from any UEs in the source cell, including the first UE.

19. The method of claim 15, further comprising receiving feedback information from the first UE using a set of time-frequency resources, wherein the set of time-frequency resources is indicated in the configuration information.

20. The method of claim 19, wherein:
the feedback information comprises hybrid automatic repeat request (HARQ) information received in uplink control information (UCI) and having a HARQ identifier associated with the conditional handover;
the HARQ information comprises an acknowledgement (ACK) indicating the UE is able to execute the conditional handover; and
the HARQ information comprises an negative acknowledgement (NACK) indicating the UE is unable to execute the conditional handover.

21. The method of claim 19, wherein the set of time-frequency resources are shared with a plurality of UEs in the source cell, including the first UE.

22. The method of claim 21, wherein:
based on the set of time-frequency resources being shared with the plurality of UEs, the trigger signal includes an indication of a first subset of time-frequency resources, from the set of time-frequency resources, allocated to the first UE for transmitting the feedback information; and
the first subset of time-frequency resources is different from at least a second subset of time-frequency resources, from the set of time-frequency resources, allocated to a second UE.

23. The method of claim 19, wherein receiving the feedback information comprises receiving negative acknowledgement (NACK) information indicating that at least one of the one or more conditions is not satisfied.

24. The method of claim 23, wherein:
the NACK information is received from the first UE prior to expiration of a conditional handover execution timer associated with the first UE; and
taking the one or more actions comprises not entering the NES mode based on the reception of the NACK information.

25. The method of claim 23, wherein receiving the NACK information comprises at least one of:
receiving the NACK information in uplink control information (UCI) on a physical uplink control channel (PUCCH); or
receiving the NACK information in a media access control-control element (MAC-CE) on a physical uplink shared channel (PUSCH); or
receiving a random access channel (RACH) transmission from the first UE, wherein the RACH transmission indicates the NACK information.

26. The method of claim 19, wherein:
receiving the feedback information comprises receiving acknowledgement (ACK) information from the first UE indicating that all conditions in the one or more conditions are satisfied; and
taking the one or more actions comprises entering the NES mode after receiving ACK information from all connected UEs in the source cell, including the ACK information received from the first UE.

27. The method of claim 15, wherein:
taking the one or more actions comprises entering the NES mode only after receiving conditional handover success information for each UE of one or more UEs previously served by the first network entity associated with the source cell, including the first UE; and
one of:
the conditional handover success information is received from one or more respective target cells associated with each UE of the one or more UEs, including the target cell associated with the first UE; or
the conditional handover success information is received, from the second network entity associated with the target cell, in one handover success message that indicates the conditional handover success information for multiple UEs, including the first UE.

28. The method of claim 15, wherein the trigger signal comprises one of:
a unicast downlink control information (DCI) message;
a unicast a media access control-control element (MAC-CE) message; or
a broadcast group downlink control information (DCI) message.

29. A first user equipment (UE), comprising:
one or more memories comprising executable instructions; and
one or more processors configured to execute the executable instructions to cause the first UE to:
receive, from a first network entity associated with a source cell, configuration information indicating one or more conditions for executing a conditional handover from the first network entity associated with the source cell to a second network entity associated with a target cell;
receive, from the first network entity associated with the source cell, a trigger signal including a trigger command for the conditional handover; and
take one or more actions related to executing the conditional handover based on the trigger signal and the one or more conditions, wherein the one or more conditions comprise at least a conditional handover execution timer expiring following reception of the trigger signal.

30. A first network entity, comprising:
one or more memories comprising executable instructions; and
one or more processors configured to execute the executable instructions to cause the first network entity to:
transmit, to a first user equipment (UE), configuration information indicating one or more conditions for executing a conditional handover from the first network entity associated with source cell to a second network entity associated with a target cell;
determine to enter a network energy saving (NES) mode;
transmit, to the first UE based on the determination to enter the NES mode, a trigger signal including a trigger command for the conditional handover; and
take one or more actions related to entering the NES mode based on trigger signal, wherein the one or more conditions comprise at least a conditional handover execution timer expiring following reception of the trigger signal.

\* \* \* \* \*